(12) United States Patent
Zuleger

(10) Patent No.: US 11,034,206 B2
(45) Date of Patent: *Jun. 15, 2021

(54) SWAY BAR AND BUSHING SYSTEMS AND METHODS

(71) Applicant: Oshkosh Defense, LLC, Oshkosh, WI (US)

(72) Inventor: Jason Zuleger, Appleton, WI (US)

(73) Assignee: Oshkosh Defense, LLC, Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/005,989

(22) Filed: Aug. 28, 2020

(65) Prior Publication Data
US 2020/0391569 A1 Dec. 17, 2020

Related U.S. Application Data

(63) Continuation of application No. 15/956,981, filed on Apr. 19, 2018, now Pat. No. 10,759,251.

(60) Provisional application No. 62/491,133, filed on Apr. 27, 2017.

(51) Int. Cl.
*B60G 21/055* (2006.01)

(52) U.S. Cl.
CPC ...... *B60G 21/0551* (2013.01); *B60G 2204/43* (2013.01); *B60G 2300/0262* (2013.01); *B60G 2800/0122* (2013.01)

(58) Field of Classification Search
CPC ............................ B60G 21/052; B60G 21/0551
See application file for complete search history.

(56) References Cited

U.S. PATENT DOCUMENTS

| | | | |
|---|---|---|---|
| 2,127,518 A | * | 8/1938 | Huntman ........... B60G 21/0551 267/191 |
| 7,322,591 B2 | | 1/2008 | Seki |
| 8,465,025 B2 | | 6/2013 | Venton-Walters et al. |
| 8,596,648 B2 | | 12/2013 | Venton-Walters et al. |
| 8,764,029 B2 | | 7/2014 | Venton-Walters et al. |
| 8,801,017 B2 | | 8/2014 | Ellifson et al. |
| 8,821,130 B2 | | 9/2014 | Venton-Walters et al. |

(Continued)

FOREIGN PATENT DOCUMENTS

| | | |
|---|---|---|
| DE | 10 2011 112 387 | 3/2013 |
| EP | 2 650 151 | 10/2013 |

(Continued)

*Primary Examiner* — James A English
(74) *Attorney, Agent, or Firm* — Foley & Lardner LLP (57) ABSTRACT

A vehicle includes a frame, a first mounting bracket, a second mounting bracket, and a sway bar assembly. The frame includes a first member including a first opening and a second member including a second opening. The first mounting bracket is disposed proximal the first member and includes a first panel and a second panel. The first panel is substantially parallel to a surface of the first member and defines a bar opening that is substantially aligned with the first opening. The second panel extends substantially perpendicular to the first panel and includes an aperture that is substantially aligned with the bar opening. The sway bar assembly includes a bar having a first end and a second end. The bar extends through the first opening and the second opening and is rotatably coupled to the first mounting bracket and the second mounting bracket.

19 Claims, 9 Drawing Sheets

(56) References Cited

U.S. PATENT DOCUMENTS

| | | | |
|---|---|---|---|
| 8,991,834 B2 | 3/2015 | Venton-Walters et al. | |
| 8,991,840 B2 | 3/2015 | Zuleger et al. | |
| 9,174,686 B1 | 11/2015 | Messina et al. | |
| 9,291,230 B2 | 3/2016 | Ellifson et al. | |
| 9,303,715 B2 | 4/2016 | Dillman et al. | |
| 9,581,153 B2 | 2/2017 | Venton-Walters et al. | |
| 9,669,679 B2 | 6/2017 | Zuleger et al. | |
| 9,688,112 B2 | 6/2017 | Venton-Walters et al. | |
| 9,707,869 B1 | 7/2017 | Messina et al. | |
| 9,809,080 B2 | 11/2017 | Ellifson et al. | |
| 9,944,145 B2 | 4/2018 | Dillman et al. | |
| 10,030,737 B2 | 7/2018 | Dillman et al. | |
| 2015/0258872 A1* | 9/2015 | Lee | B60G 21/051 |
| | | | 280/124.13 |
| 2017/0008361 A1 | 1/2017 | Langhorst et al. | |

FOREIGN PATENT DOCUMENTS

| | | |
|---|---|---|
| JP | 2000-108633 | 4/2000 |
| JP | 2000-142054 | 5/2000 |

\* cited by examiner

SWAY BAR AND BUSHING SYSTEMS AND METHODS

CROSS REFERENCE TO RELATED PATENT APPLICATIONS

This application is a continuation of U.S. patent application Ser. No. 15/956,981, filed Apr. 19, 2018, which claims the benefit of U.S. Provisional Application No. 62/491,133, filed Apr. 27, 2017, both of which are incorporated herein by reference in their entireties.

BACKGROUND

The present disclosure generally relates to the field of vehicle suspension systems. More specifically, the present disclosure relates to a sway bar assembly used to transmit input forces from one side of a vehicle another.

A suspension system is used to couple the chassis of a vehicle to a ground surface. Vehicles traveling along a surface (e.g., pavement, asphalt, gravel, earth, sand, etc.) may encounter various driving situations. A first driving situation occurs when the vehicle travels over an obstacles or variations. Such obstacles may include rocks, potholes, and curbs, among obstructions, and such variations may include depressions, inclines, and bumps, among other deviations from the surface. Further, a vehicle may encounter a second driving situation when the vehicle is steered aggressively. A vehicle may encounter a third driving situation when the vehicle is steered around a corner having a large radius (i.e., a long and sweeping driving maneuver). Still other driving situations are possible and vary based on the surfaces, speeds, and environment involved.

Suspension systems are designed to at least partially isolate the body of a vehicle during such driving situations. Traditional suspension systems include the MacPherson strut system, the "double A-arm" suspension system, and the trailing arm suspension system, among others. A trailing arm suspension system includes two swing arms that rotate about a pivot axis. Such systems may further include springs, struts, and a sway bar, among other components. A sway bar may be included to couple the opposing sides of a suspension system to encourage movement of one side upon movement of the other. As one side of the suspension receives an input force, the force may be transmitted to the other side by twisting the sway bar. Sway bars often impact other suspension or chassis components during jounce or rebound, and such impact may limit the potential wheel travel of the suspension system.

SUMMARY

One embodiment relates to a vehicle. The vehicle includes a frame, a first mounting bracket, a second mounting bracket, and a sway bar assembly. The frame includes a first member including a first opening and a second member including a second opening. The first member and the second member are spaced apart from one another in at least one position. The first mounting bracket is disposed proximal the first member and includes a first panel and a second panel. The first panel is substantially parallel to a surface of the first member and defines a bar opening that is substantially aligned with the first opening. The second panel extends substantially perpendicular to the first panel and includes an aperture that is substantially aligned with the bar opening. The second mounting bracket is disposed proximal the second member. The sway bar assembly includes a bar having a first end and a second end. The bar extends through the first opening and the second opening and is rotatably coupled to the first mounting bracket and the second mounting bracket. The first end of the bar extends outward of the first member and the second end of the bar extends outward of the second member.

In any of the above embodiments, a set of symmetrical mounting blocks may be used to position the bar with respect to the second panel. Specifically, each set of mounting blocks may be rotatably coupled to a bushing disposed on the bar. The bushing may be received in a groove on the mounting blocks. In any of the above embodiments, the axial ends of the bushing may be of a reduced thickness. Extending portions on the inner and outer surfaces of the set of mounting blocks may interface with the axial ends of the bushing to prevent debris from migrating into the connection between the bushing and the set of mounting blocks. Furthermore, the set of mounting blocks may be offset from the first panel to prevent wear of the first panel due to bar rotation. In any of the above embodiments, a mounting ring may be disposed on the bar adjacent to the set of mounting blocks, the mounting ring configured to substantially cover a joint; for example, between the bushing and the set of mounting blocks, further preventing debris from migrating into the bushing-mounting block interface.

Another embodiment relates to a mounting bracket for a sway bar assembly. The mounting bracket includes a first panel, a second panel, and a support panel. The first panel defines a bar opening. The second panel is coupled to the first panel and extends away from the first panel in substantially perpendicular orientation relative to the first panel. The second panel defines an aperture that is substantially aligned with the bar opening. The support panel is coupled to the first panel and the second panel. The support panel is angled with respect to both the first panel and the second panel.

Yet another embodiment relates to a mounting bracket for a sway bar assembly. The mounting bracket includes a first panel that defines a bar opening, a first extension coupled to the first panel and extending away from the first panel in a substantially perpendicular orientation relative to the first panel, and a second extension coupled to the first panel and extending away from the first pane in a substantially perpendicular orientation relative to the first panel. The second extension is substantially parallel to the first extension and is spaced apart from the first extension at the bar opening to form a gap therebetween.

The invention is capable of other embodiments and of being carried out in various ways. Alternative exemplary embodiments relate to other features and combinations of features as may be recited in the claim.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, a vehicle includes a suspension system that includes a sway bar having various features that improve performance relative to traditional systems. In a first aspect, the sway bar extends through an opening in a frame of the vehicle, and is rotatably coupled to the frame with a bushing that surrounds the sway bar. The bushing is coupled to the frame with a mounting block that centers the bushing and sway bar with respect to a mounting bracket to facilitate the clearance of other components of the vehicle. Additionally, the mounting block may completely surround the bushing such that interfaces between the sway bar and bushing are completely protected from debris.

In another aspect, the sway bar includes a bent portion that is coupled to a swing arm of the vehicle's suspension system. The bent portion is specifically designed to increase (e.g., maximize, etc.) clearance for wheels of the vehicle. As such, the bending portions increase the operational movement range of the suspension system.

In yet another aspect, side plates that couple the suspension system to the frame of the vehicle include openings that are specifically designed to accommodate a brake routing support of a vehicle braking system that a union is mounted to so that a flexible hose of the braking system does not chafe against the side plate. This protects the union from wear and tear.

Figure 1:
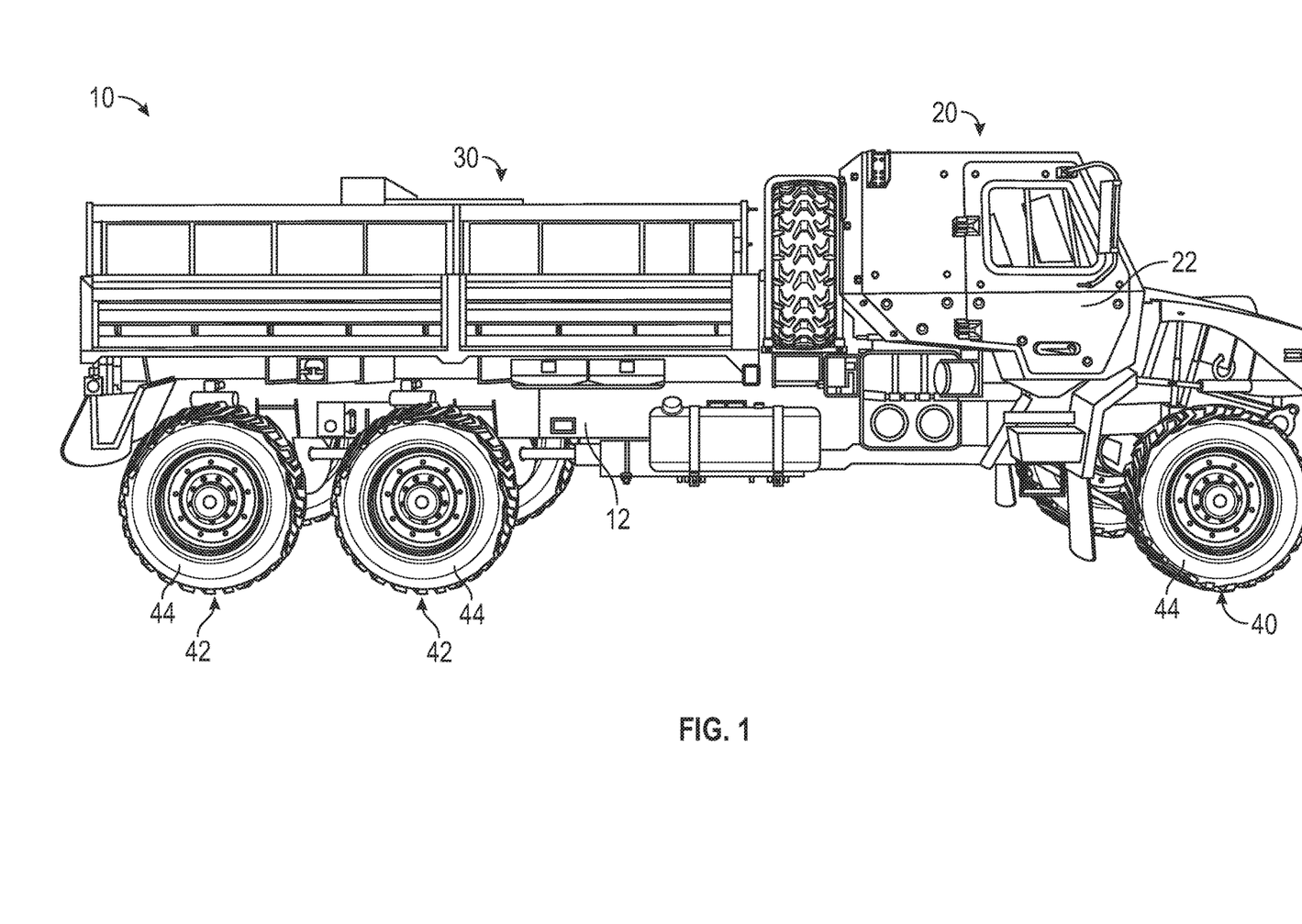
FIG. 1 is a side view of a vehicle, according to an illustrative embodiment.

According to the exemplary embodiment shown in FIG. 1, a vehicle, shown as vehicle 10, includes a chassis, shown as frame 12, that supports a body assembly including a first portion, shown as front cabin 20, and a second portion, shown as mission equipment 30. As shown in FIG. 1, the mission equipment 30 is disposed behind the front cabin 20. The frame 12 of the vehicle 10 engages a plurality of tractive assemblies, shown as front tractive assemblies 40 and rear tractive assemblies 42. According to an exemplary embodiment, the vehicle 10 is a military ground vehicle. In other embodiments, the vehicle 10 is an off-road vehicle such as a utility task vehicle, a recreational off-highway vehicle, an all-terrain vehicle, a sport utility vehicle, and/or still another vehicle. In yet other embodiments, the vehicle 10 is another type of off-road vehicle such as mining, construction, and/or farming equipment. In still other embodiments, the vehicle 10 is an aerial truck, a rescue truck, an aircraft rescue and firefighting (ARFF) truck, a concrete mixer truck, a refuse truck, a commercial truck, a tanker, an ambulance, and/or still another vehicle.

According to an exemplary embodiment, the frame 12 defines a longitudinal axis. The longitudinal axis may be generally aligned with a frame rail of the frame 12 of the vehicle 10 (e.g., front-to-back). In alternative embodiments, the vehicle 10 includes a plurality of front tractive assemblies 40 and/or a plurality of rear tractive assemblies 42 (e.g., one, two, etc.). The front tractive assemblies 40 and/or the rear tractive assemblies 42 may include brakes (e.g., disc brakes, drum brakes, air brakes, etc.), gear reductions, steering components, wheel hubs, wheels, tires, and/or other features. As shown in FIG. 1, the front tractive assemblies 40 and the rear tractive assemblies 42 each include tractive elements, shown as wheel and tire assemblies 44. In other embodiments, at least one of the front tractive assemblies 40 and the rear tractive assemblies 42 include a different type of tractive element (e.g., a track, etc.).

According to an exemplary embodiment, the front cabin 20 includes one or more doors, shown as doors 22, that facilitate entering and exiting an interior of the front cabin 20. The interior of the front cabin 20 may include a plurality of seats (e.g., two, three, four, five, etc.), vehicle controls, driving components (e.g., steering wheel, accelerator pedal, brake pedal, etc.), etc. According to the exemplary embodiment shown in FIG. 1, the mission equipment 30 includes a cargo body configured to facilitate transporting various military equipment (e.g., medical supplies, ammunition, weapons, missiles, personnel, etc.). In other embodiments, the mission equipment 30 includes a truck bed or a flat bed. In some embodiments, the mission equipment 30 additionally or alternatively includes a boom lift. In another embodiment, the mission equipment 30 includes an at least partially enclosed troop transport cabin configured to facilitate transporting troops (e.g., eight, ten, twelve, twenty, etc.) with the vehicle 10.

According to an exemplary embodiment, the vehicle 10 includes a powertrain system. The powertrain system may include a primary driver (e.g., an engine, a motor, etc.), an energy generation device (e.g., a generator, etc.), and/or an energy storage device (e.g., a battery, capacitors, ultra-capacitors, etc.) electrically coupled to the energy generation device. The primary driver may receive fuel (e.g., gasoline, diesel, etc.) from a fuel tank and combust the fuel to generate mechanical energy. A transmission may receive the mechanical energy and provide an output to the generator. The generator may be configured to convert mechanical energy into electrical energy that may be stored by the energy storage device. The energy storage device may provide electrical energy to a motive driver to drive at least one of the front tractive assemblies 40 and the rear tractive assemblies 42. In some embodiments, each of the front tractive assemblies 40 and/or the rear tractive assemblies 42 include an individual motive driver (e.g., a motor that is electrically coupled to the energy storage device, etc.) configured to facilitate independently driving each of the wheel and tire assemblies 44. In some embodiments, a transmission of the vehicle 10 is rotationally coupled to the primary driver, a transfer case assembly, and one or more drive shafts. The one or more drive shafts may be received by one or more differentials configured to convey the rotational energy of the drive shaft to a final drive (e.g., half-shafts coupled to the wheel and tire assemblies 44, etc.). The final drive may then propel or moves the vehicle 10. In such embodiments, the vehicle 10 may not include the generator and/or the energy storage device. The powertrain of the vehicle 10 may thereby be a hybrid powertrain or a non-hybrid powertrain. According to an exemplary embodiment, the primary driver is a compression-ignition internal combustion engine that utilizes diesel fuel. In alternative embodiments, the primary driver is another type of device (e.g., spark-ignition engine, fuel cell, electric motor, etc.) that is otherwise powered (e.g., with gasoline, compressed natural gas, hydrogen, electricity, etc.).

According to an exemplary embodiments, a first suspension system is coupled to the front tractive assemblies 40 and frame 12 of the vehicle 10, and a second suspension system, and in some embodiments a third suspension system, is coupled to the rear tractive assemblies 42 and frame 12 of the vehicle 10. The suspension systems are configured to dampen the forces imparted on the vehicle 10 when the vehicle 10 encounters various obstacles (e.g., bumps, depressions, turns, etc.). In one embodiment, both the first and second suspension systems include swing arms on either side of the vehicle 10. The swing arms may be coupled to one another by sway bar assemblies to prevent tilting of the vehicle 10. In an embodiment, the sway bar assembly associated with the second suspension system (e.g., associated with the rear tractive assemblies 42) differs from that of the first suspension system (e.g., associated with front tractive assemblies 40). The second suspension system may include a single piece sway bar coupling the swing arms on either side of the vehicle. The first suspension system may include a multi-piece sway bar. The structure of the multi-piece sway bar is described in further detail below.

Figure 2A:
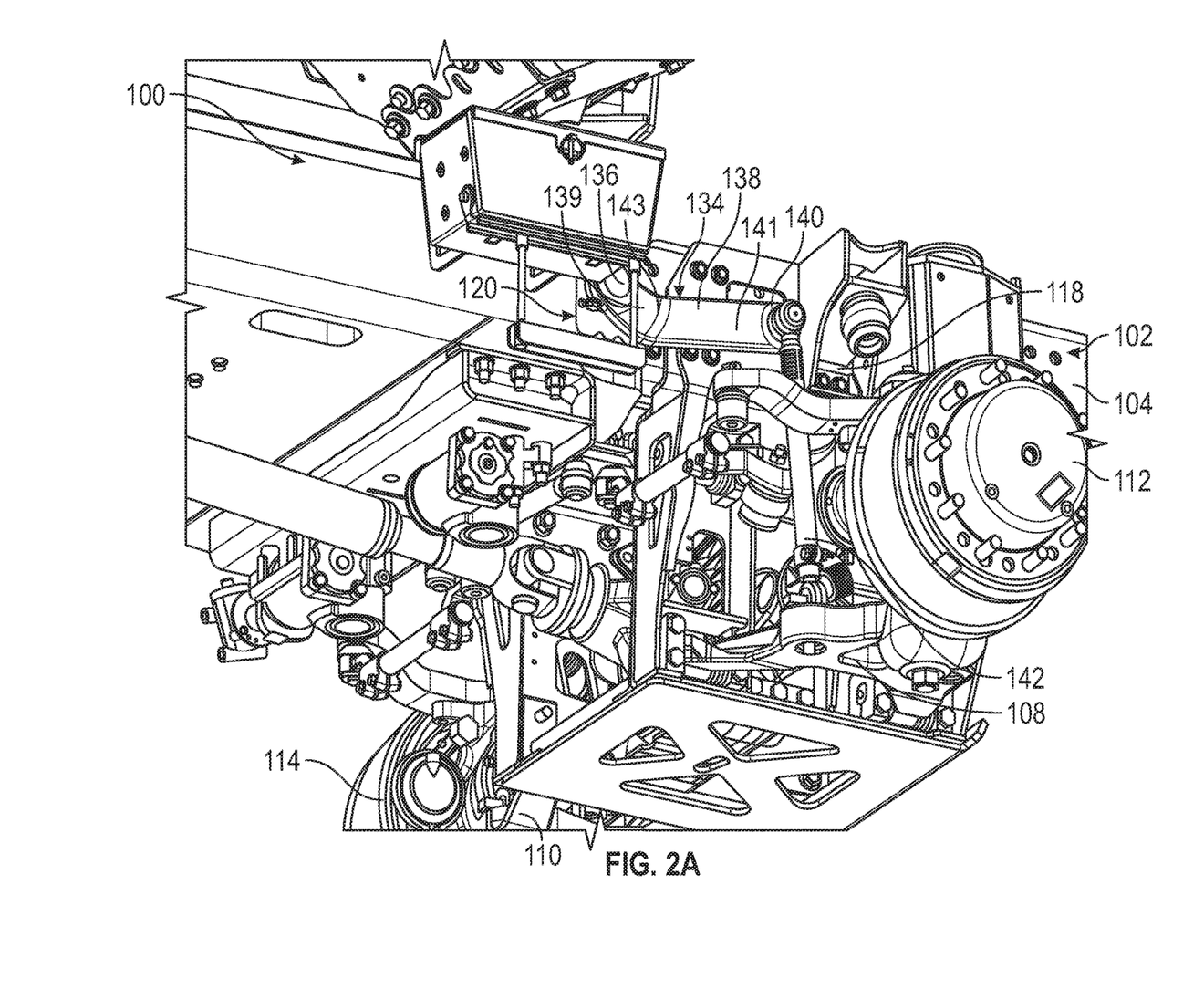
FIG. 2A is a perspective view of a suspension system of a vehicle, according to an illustrative embodiment.
Figure 2B:
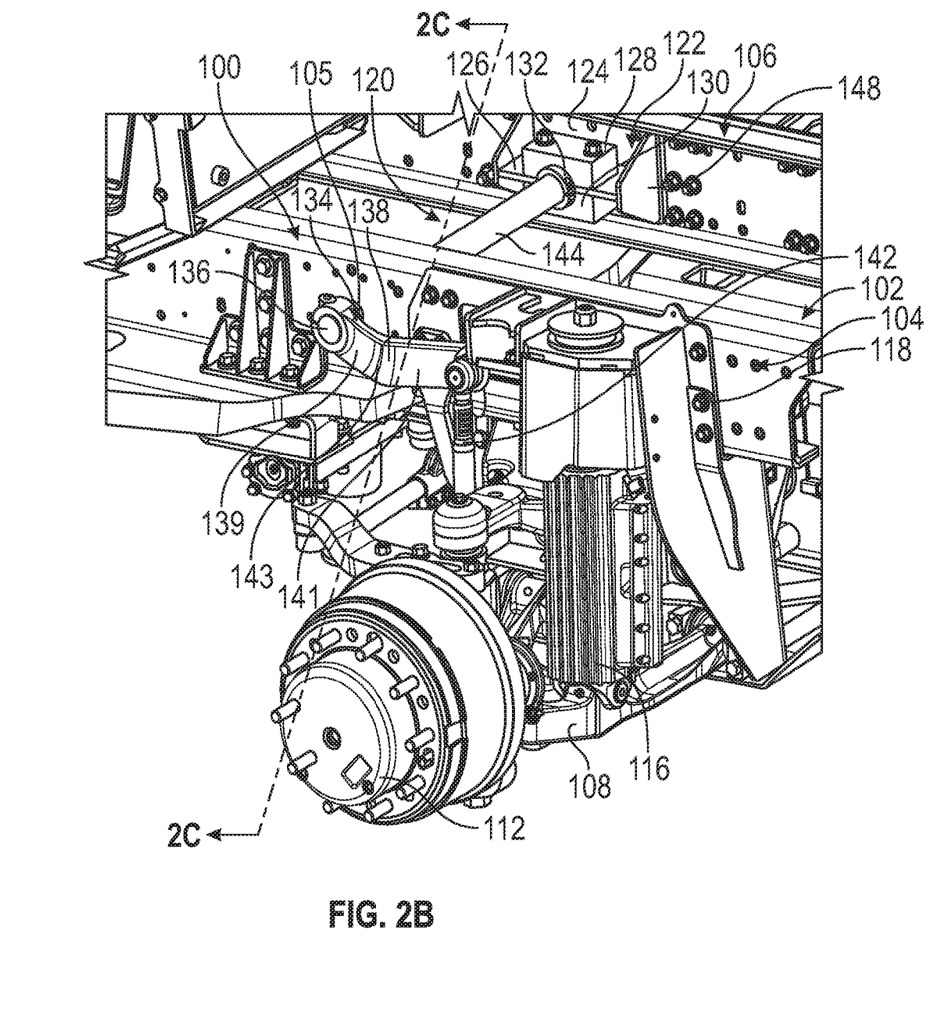
FIG. 2B is a perspective view of the suspension system of FIG. 2A.
Figure 2C:
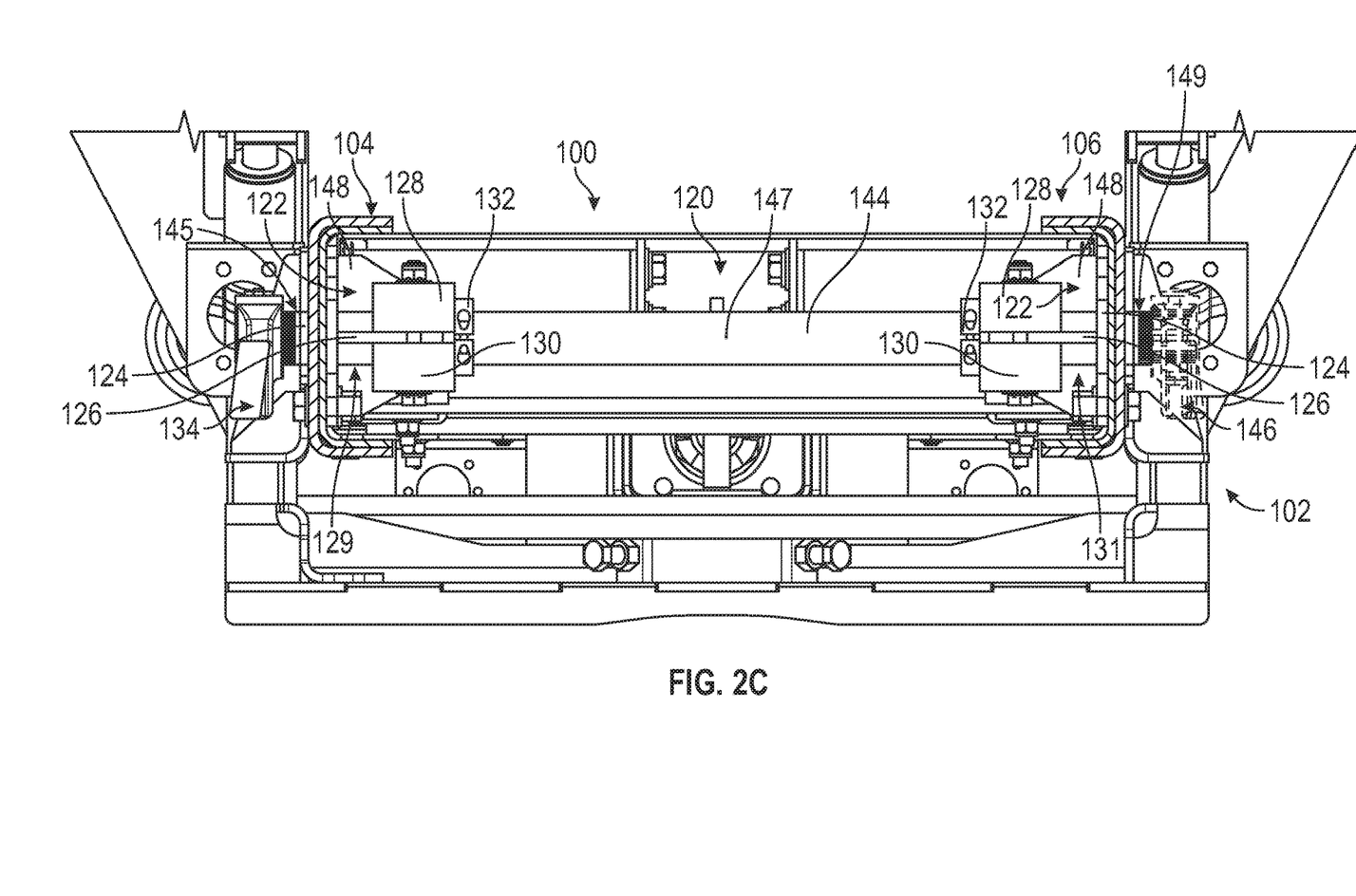
FIG. 2C is a front view of the suspension system of FIG. 2A, at a cross-section through part of the suspension system.

Referring now to FIGS. 2A-2C, a vehicle, such as the vehicle 10 (shown in FIG. 1), may include a suspension system, shown as suspension system 100. Suspension system 100 is intended to aid in isolating a vehicle body from forces imparted on the vehicle from a road surface, an obstacle, or another input (e.g., explosion, etc.). Such isolation may include absorbing forces imparted on suspension system 100 or may include directing forces within suspension system 100 to modify the reaction experienced by the vehicle body.

As shown in FIGS. 2A-2C, suspension system 100 is coupled to a vehicle frame, shown as frame 102. Frame 102 includes a first member and a second member, shown as a first frame rail 104 and a second frame rail 106, that define a longitudinal axis of the frame 102. As shown in FIG. 2C, the first frame rail 104 and the second frame rail 106 are substantially parallel in at least one position and are spaced a distance apart from one another in at least one position.

As shown in FIGS. 2A-2C, suspension system 100 includes a first suspension member, shown as first swing arm 108, and a second suspension member, shown as second swing arm 110. First swing arm 108 and second swing arm 110 may be arranged on opposing sides of a central longitudinal axis of the suspension system 100 (see FIG. 2B). Suspension system 100 further includes a wheel end, shown as hub 112, coupled to an end of first swing arm 108. Hub 112 is configured to rotate about its axis and interface with a driven member (e.g., tire, etc.) that couples suspension system 100 to a road surface. According to an exemplary embodiment, hub 112 includes various internal components (e.g., bearings, bushings, washers, brake assemblies, etc.) to facilitate the operation of a vehicle or suspension system 100. Suspension system 100 further includes another wheel end, shown in FIG. 2A as hub 114, coupled to an end of the second swing arm 110. Hub 114 is of generally similar construction to the hub 114.

As shown in FIG. 2B, suspension system 100 further includes a first suspension element, shown as an integrated spring damper 116, coupled to the first swing arm 108. The integrated spring damper 116 is configured to provide both the functionality of a gas spring and the damping functionality of a hydraulic damper. The integrated spring damper 116 facilitates raising and/or lowering the ride height of the suspension system 100 to be raised or lowered (e.g., a kneel function). The integrated spring damper 116 is smaller and a more robust package than a typical gas spring. The integrated spring damper 116 also utilizes less hydraulic fluid than traditional dampers, provides increased damping control, and offers increased service life. According to an exemplary embodiment, the integrated spring damper 116 includes at least two variable volume internal chambers containing a hydraulic fluid and dampens forces imparted on the suspension system 100 resulting from encountering various obstacles by enabling fluid to flow between the chambers. Suspension system 100 further includes second suspension element (not shown) coupled to the second swing arm 110 (shown in FIG. 2A) that is similar in structure and function to the integrated spring damper 116.

As shown in FIGS. 2A-2B, first swing arm 108 is coupled to the first frame rail 104 with a first mounting member, shown as a first side plate 118. The first side plate 118 is attached to an outer surface of the first frame rail 104 with a number of fasteners (e.g., bolts, etc.). In an alternative embodiment, the first side plate 118 is otherwise attached to the first frame rail 104 (e.g., welding). The suspension system 100 also includes a second side plate (not shown) that similarly couples the second swing arm 110 (shown in FIG. 2A) to the second frame rail 106.

In the embodiment shown in FIGS. 2A-2B, a first end (e.g., a lower end) of the integrated spring damper 116 is rotatably coupled to first swing arm 108, and a second end (e.g., an upper end) of the integrated spring damper 116 is fixedly coupled to the first side plate 118. As such, upon the vehicle encountering an obstacle, the integrated spring damper 116 rotates with respect to the first side plate 118 due to the movement of the first swing arm 108. Such rotation causes the volumes of internal chambers in the integrated spring damper 116 to change. Resistance to flow of the fluid in the internal chambers of the integrated spring damper 116 dampens the forces imparted on the frame 102 (and thus any occupants of the vehicle) resulting from the obstacles.

As shown in FIGS. 2A-2C, the suspension system 100 further includes a bar, shown as sway bar 120, that is configured to couple the first swing arm 108 to the second swing arm 110 (shown in FIG. 2A). Such coupling encourages movement of one side of the suspension system 100 upon the movement of the other. This way, any leaning of the vehicle that may result from any obstacles encountered (e.g., fast turns, large positive or negative obstacles on the road, etc.) is reduced (e.g., prevented, etc.).

To facilitate a counterbalancing movement by one of the swing arms 108 and 110 in the event that the vehicle encounters an obstacle on a side of the other one of the swing arms 108 and 110, the sway bar 120 is configured to rotationally couple the first swing arm 108 to the second swing arm 110 (shown in FIG. 2A). To facilitate such a rotational coupling, the sway bar 120 is coupled to the first and second frame rails 104 and 106 with mounting structures, shown as mounting brackets 122 (shown in FIGS. 2B and 2C). In the embodiment shown in FIG. 2C, a first mounting bracket 122 is disposed proximal the first frame rail 104, while a second mounting bracket 123 is disposed proximal a second frame rail 106. As shown in FIGS. 2B and 2C, each of the mounting brackets 122 includes a first panel 124 that is substantially parallel to surfaces of the first and second frame rails 104 and 106. In the example shown, first panels 124 include several openings into which various fasteners (e.g., screws, etc.) are inserted to attach the mounting brackets 122 to the first and second frame rails 104 and 106. First panels 124 also include bar openings that are configured to receive a bar, shown as rod portion 144 of the sway bar 120. Likewise, each of the first and second frame rail 104 and 106 include an opening, a first opening in the first frame rail 104 and a second opening in the second frame rail 106 (e.g., second opening 105 shown in FIG. 2B) that is configured to receive a rod portion 144 of the sway bar 120. Additionally, the mounting brackets 122 are mounted to the first and second frame rails 104 and 106 in such a position that openings in the first and second frame rails 104 and 106 substantially align with the openings in the first panels 124. This way, a rod portion 144 of the sway bar 120 may be inserted through the combination of the first panels 124 and the first and second frame rails 104 and 106. In other embodiments, the sway bar 120 may extend above or below the first and second frame rails 104 and 106.

In the embodiment shown in FIGS. 2B-2C, the mounting brackets 122 further include second panels 126 that are substantially perpendicular to the first panels 124. The second panels 126 are substantially centered on the first panels 124 and extend towards the center of the suspension system 100. The second panels 126 include gaps configured to receive both a rod portion 144 of the sway bar 120 and bushings coupled to the rod portion 144. The gaps align with the openings in the first panel 124 and the openings in the first and second frame rails 104 and 106. Ends of the rod portion 144 extend through the openings and outward of the first and second frame rails 104 and 106, a first end 145 of the rod portion 144 extending outward (e.g., in a direction away a central axis 147 parallel the first and second frame rails 104 and 106 and centered between the first and second frame rails 104 and 106) of the first frame rail 104 and a second end 149 of the rod portion 144 extending outward of the second frame rail 106 (shown in FIG. 2C).

In the embodiment shown in FIGS. 2B-2C, the sway bar 120 is rotatably coupled to the mounting brackets 122 with mounting devices, shown as first mounting blocks 128 and second mounting blocks 130. The first mounting blocks 128 and the second mounting blocks 130 are substantially symmetrical. In the example shown, both the first mounting blocks 128 and the second mounting blocks 130 include a semi-circular opening (shown in FIG. 2B). The semi-circular openings align with one another such that, when the first and second mounting blocks are affixed to one another with openings in faces thereof, substantially circular openings are formed. The substantially circular openings are configured to receive a rod portion 144 of the sway bar 120 and bushings that surround the sway bar 120. As such, upon the tightening of fasteners that couple the first mounting blocks 128 to the second mounting blocks 130 when the bushing and sway bar 120 are disposed in the gaps in the second panels 126, the bushings are securely enclosed in the substantially-circular opening. Thus, the sway bar 120 is rotatably coupled to the first and second frame rails 104 and 106.

As shown in FIGS. 2B-2C, the sway bar 120 further includes mounting rings, shown as mounting rings 132, disposed on a the rod portion 144 of the sway bar 120 adjacent to the first and second mounting blocks 128 and 130. As such, the surfaces at which the sway bar 120, the bushings, and the first and second mounting blocks 128 and 130 join are unexposed to the outside of the vehicle. As such, the coupling points between the sway bar 120 and frame 102 are protected from debris, and a long-lasting, sound rotational coupling is provided.

Referring now to FIGS. 2A-2B, sway bar 120 further includes a member, shown as bending portion 134, that is coupled to a first end of the rod portion 144 (shown in FIG. 2B) of the sway bar 120, outward from the first frame rail 104 (e.g., on the opposite side of the first frame rail 104 at the first panel 124). Bending portion 134 includes an interface portion, shown as a cap 136. In one embodiment, cap 136 defines an internal volume defined by a surface including various connecting grooves that correspond to an outer surface of the first end of the rod portion 144 (shown in FIG. 2B). In some embodiments, the cap 136 is fixedly coupled (e.g., not rotatably coupled to) the first end of the rod portion 144 (shown in FIG. 2B) of the sway bar 120.

As shown in FIGS. 2A and 2B, bending portion 134 further includes a body, shown as body 138. Body 138 includes a first portion 139 that extends in a first direction from the cap 136 towards (e.g., at least partially towards) the first swing arm 108 and a second portion 141 that extends in a second direction at an angle from the first direction away from the first swing arm 108. Body 138 further includes a bend 143 at an angle separating the first portion 139 from the second portion 141. In various embodiments, the angle is an obtuse angle. In some embodiments, the angle is between 110 and 170 degrees. In an embodiment, at least a part (e.g., cap 136, etc.) of the first portion 139 of the body 138 extends outward from the center of the suspension system (e.g. away from the first frame rail 104), while the second portion 141 extends substantially parallel to the first frame rail 104. As such, the bend 143 in the body 138 may change the direction of the extension of the body 138; for example, such that (1) as the body 138 extends away from the cap 136, the distance between the lower surface of the body 138 and the first swing arm 108 gets greater and (2) as the body 138 extends away from the cap 136, the distance between the body 138 and the first frame rail 104 remains relatively constant. Such a configuration facilitates providing clearance for various other components (e.g., wheels, etc.) of the vehicle.

As shown in FIGS. 2A-2B, body 138 further includes an end portion, shown as end 140 that includes an end opening. In the embodiment of FIGS. 2A-2B, the second portion 141 is disposed between the end 140 and the bend 143. In an embodiment, the end opening is substantially circular. In alternative embodiments, the end opening may be various other shapes. The end opening is configured to receive a linking portion, shown as link 142. A first end of the link 142 includes a portion that is inserted through the openings in the end 140 of the body 138 of the bending portion 134. A second end of the link 142 is attached to the first swing arm 108. In one embodiment, the first end of the link 142 is fixedly engaged (e.g., not rotatably coupled to) the end 140 of the body 138. Alternatively, the first end of the link 142 is rotatably coupled to the end 140 of the body 138. In either configuration, upon vertical displacement of the first swing arm 108 (e.g., resulting from the vehicle encountering an obstacle) the end 140 of the body 138 is displaced in a manner that corresponds to the displacement of the first swing arm 108. Such displacement will result in rotation of the rod portion 144 (e.g., because the cap 136 is fixedly mounted to the rod portion 144). Thus, the rod portion 144 rotates as a result of displacement of the first swing arm 108.

Figure 3A:
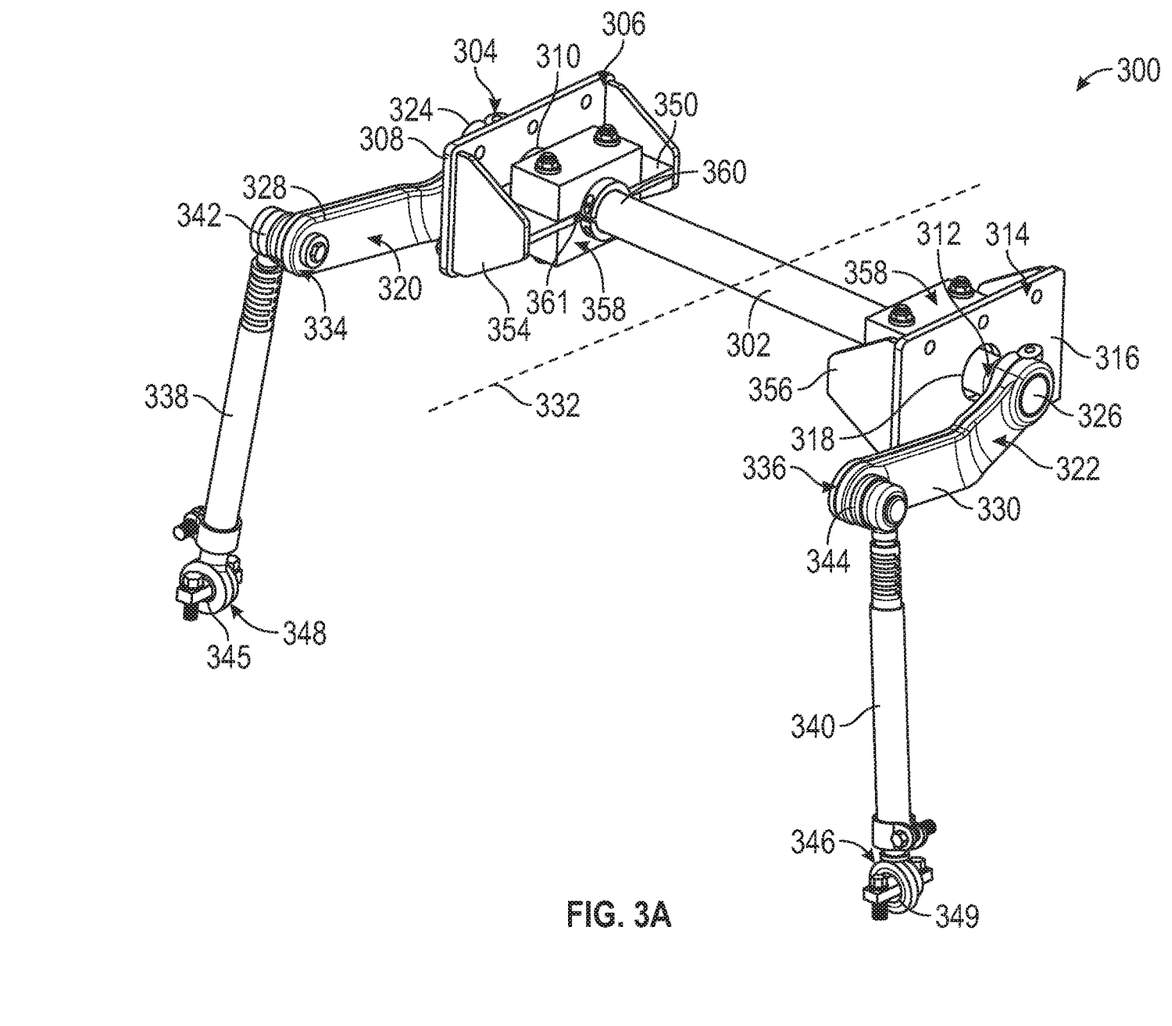
FIG. 3A is perspective view of a sway bar system, according to an illustrative embodiment.
Figure 3B:
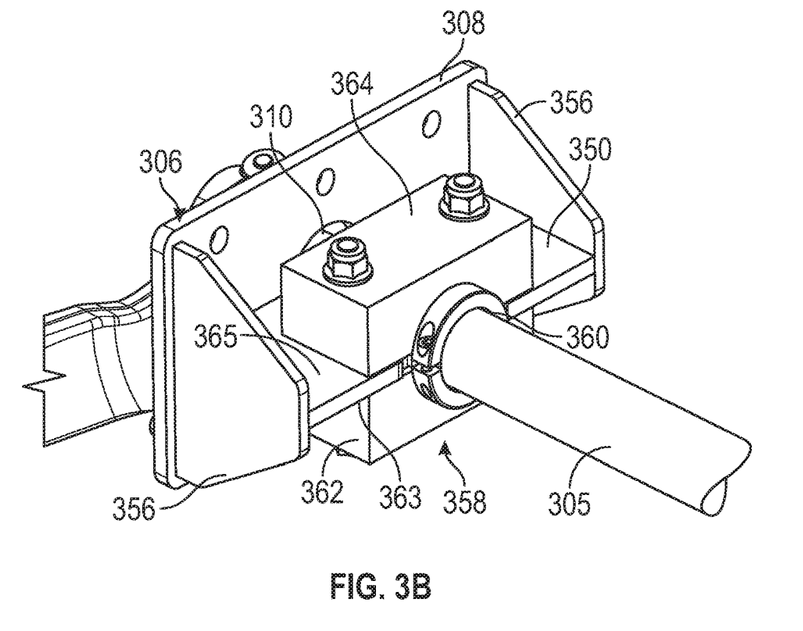
FIG. 3B is a perspective view of a sway bar system of FIG. 3A, according to an exemplary embodiment.
Figure 3C:
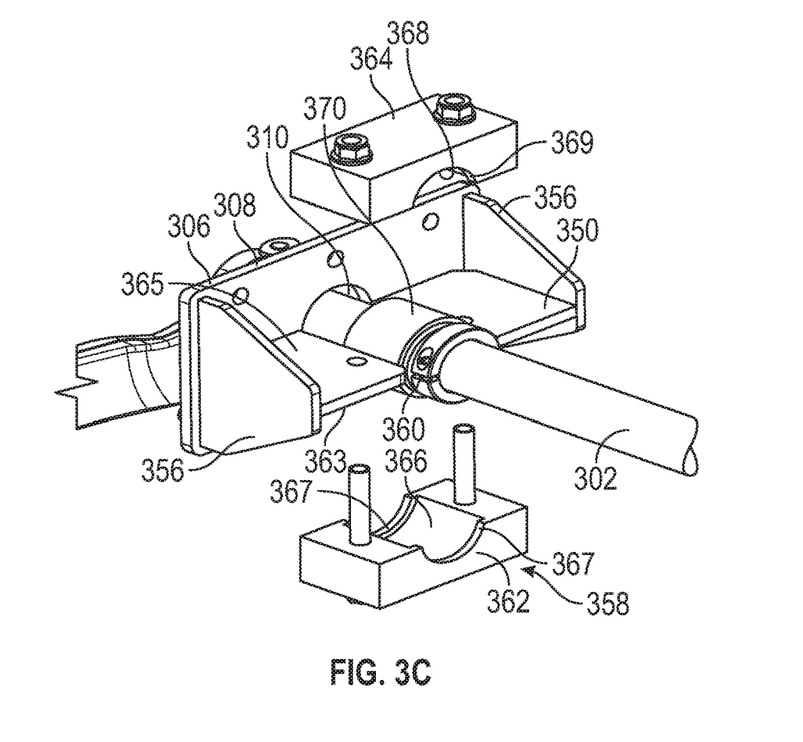
FIG. 3C is an exploded prospective view of a mounting device from the sway bar system of FIG. 3B.

As shown partially in FIG. 3C, a second end of the rod portion 144 is coupled to a second bending portion 146 similar in structure to the bending portion 134 (e.g. a mirror image of bending portion 134). The second bending portion 146 is coupled to the second swing arm 110 with a second link that is similar to the link 142 (e.g. a copy of link 142). As such, rotation of the rod portion 144 resulting from displacement of the first swing arm 108 results in the application of rotational energy to the second swing arm 110 with the sway bar 120. Such counterbalancing forces prevent swaying of the vehicle, and ensure safety despite any obstacles that may be encountered by the vehicle.

Also as shown in FIG. 2C, each of the mounting brackets 122 further include two support panels 148 (also see FIG. 2B). In the embodiment shown, the support panels are substantially triangular shaped and extend in a direction that is substantially perpendicular to both the first panel 124 and the second panel 126. Support panels 148 extend inwardly, towards the center of the suspension system 100 on either side of the rod portion 144 of the sway bar 120. As such, the first and second mounting blocks 128 and 130 are substantially surrounded by the support panels 148, which further protects the point of coupling between the rod portion 144 and the first and second frame rails 104 and 106 from debris. In other embodiments, support panels 148 have another shape.

Additionally, there are offset gaps 129 and 131 between the first and second mounting blocks 128 and 130 and the first panels 124 of the mounting brackets 122. These offset gaps 129 and 131 provide clearance between bushings (e.g., that are affixed to the rod portion 144) and surfaces of the first panels 124 of the mounting brackets 122, and thus prevent rotation of the bushing from wearing down the surface of the first panels 124.

As shown in FIG. 2C, symmetrical shaping of the first and second mounting blocks 128 and 130 facilitates the centering of the rod portion 144 such that the second panels 126 cover any joints in the bushing (described below) that are affixed to the rod portion 144. As such, the unique design of the suspension system 100 facilitates a secure, protected rotational coupling between the sway bar 120 and the frame 102.

As shown in FIGS. 3A-3H, a sway bar assembly 300 is shown according to an exemplary embodiment. The sway bar assembly 300 is similar in construction and function to the sway bar 120 shown in FIGS. 2A-2C.

As shown in FIG. 3A, the sway bar assembly 300 includes a bar, shown as tubular rod 302. A first end 304 of the rod 302 extends through a first bar opening 310 in a first panel 308 of a first mounting bracket 306, and a second end 312 of the rod 302 extends through a second bar opening 318 of a first panel 316 of a second mounting bracket 314. A first bending portion 320 is coupled to the first end 304, and a second bending portion 322 is coupled to the second end 312. The first and second bending portions 320 and 322 each include caps 324 and 326 that include openings into which the first and second ends 304 and 312 of the rod 302 are inserted. First and second bending portions 320 and 322 have bodies 328 and 330 extending from the caps 324 and 326. In the example shown, the bodies 328 and 330 extend substantially parallel to one another towards an end (e.g., a rear end) of a vehicle.

Bodies 328 and 330 each include a first portion and a second portion. A bend on each body 328 and 330 separates the first and second portions of the bodies 328 and 330 such that the first portions extend at a first angle with respect to a first axis (e.g., a longitudinal axis, a central axis 332) and the second portions extend at a second angle with respect to the first axis. In one embodiment, in at least one position, the first portions of the bodies 328 and 330 extend downward from the first axis at an acute angle and the second portions of the bodies 328 and 330 extend substantially parallel to the first axes. In one embodiment, the first portions of the bodies 328 and 330 extend outwardly (e.g., away from) a central axis 332 of the sway bar assembly 300 at an angle from the central axis 332, and the second portions of the bodies 328 and 330 are substantially parallel to the central axis 332. Such bending of the bodies 328 and 330 facilitates providing clearance for various components (e.g., wheels) of a vehicle to which the sway bar assembly 300 is mounted.

As shown in FIG. 3A, ends 334 and 336 of the bodies 328 and 330 each include end openings (see for example end opening 335 in end 334 in FIG. 3D) through which portions of first ends 342 and 344 of links 338 and 340 are inserted. In the example shown, fasteners are tightened to the portions of the first ends 342 and 344 of the links 338 and 340 at inner surfaces of the ends 334 and 336 of the bodies 328 and 330. As such, links 338 and 340 are coupled to the bodies 328 and 330 of the bending portions 320 and 322. Links 338 and 340 extend downward from the mounting brackets 306 and 314. In one embodiment, links 338 and 340 extend outwardly (e.g., away) from the central axis 332 of the sway bar assembly 300. Second ends 346 and 348 of the links 338 and 340 also include openings, shown as link openings 345 and 349, respectively, configured to receive at least one fastener. The fastener(s) may be inserted to couple the links 338 and 340 to components (e.g., the first or second swing arms 108 or 110 as shown in FIG. 2A, etc.) of a suspension system of a vehicle.

The first mounting bracket 306 includes a second panel 350 that extends substantially perpendicular to the first panel 308. The second panel 350 is substantially centered in the first panel 308 and extends inwardly towards the central axis 332. As shown in FIG. 3F, the second panel 350 may include a first extension 350a and a second extension 350b. In the embodiment shown, the second mounting bracket 314 is identical to the first mounting bracket 306. The second mounting bracket 314 also includes a second panel (not shown) that extends substantially perpendicular to the first panel 316. The second panel (not shown) of the second mounting bracket 314 is substantially centered in the first panel 316 and extends inwardly towards the central axis 332. As shown in FIG. 3A, the second panel 350 of the first mounting bracket 306 includes a gap configured to receive the first end 304 of the rod 302. The gap is substantially aligned with the first bar opening 310 on the first panels 308.

The first mounting bracket 306 additionally includes a pair of substantially parallel support panels 354 with ends thereof extending from the first panel 308 towards the central axis 332. The second panel 350 extends between the pair of substantially support panels 354 from the centers thereof. In an embodiment, the first panel 308, second panel 350, and pair of substantially support panels 354 are integrally formed. In another embodiment the first panel 308, second panel 350, and pair of substantially support panels 354 are separately formed and welded together. Again, in the embodiment shown, the second mounting bracket 314 is identical to the first mounting bracket 306. The second mounting bracket 314 includes a pair of substantially support panels 356 with ends thereof extending from the first panel 316 towards the central axis 332. The second panel (not shown) extends between the pair of substantially support panels 354 from the centers thereof. In an embodiment of the second mounting bracket 314, the first panel 316, second panel (not shown), and pair of substantially support panels 354 are integrally formed. In another embodiment of the second mounting bracket 314, the first panel 316, second panel (not shown), and pair of substantially support panels 356 are separately formed and welded together.

Still referring to FIG. 3A, mounting devices, shown as sets of mounting blocks 358 are affixed to the second panels 350 and 352 of the first and second mounting brackets 306 and 314. Each set of mounting blocks 358 includes a pair of mounting blocks that are symmetrically shaped. Each mounting block includes an opening (e.g., semi-circular, etc.) such that, when the sets of mounting blocks 358 are affixed to the first and second mounting brackets 306 and 314, an opening, configured to receive a combination of the rod 302 and bushings coupled to the rod 302, is formed. Mounting rings 360 are inserted at faces of the sets of mounting blocks 358 to substantially cover and protect the point of coupling between the bushings and the mounting blocks 358 from debris (e.g., covers a joint 361 between the bushings and the mounting blocks).

As shown in FIGS. 3B-3C, each set of mounting blocks 358 includes a first mounting block 362 configured to engage with a lower face 363 of the second panel 350 and a second mounting block 364 configured to engage with an upper face 365 of the second panel 350. According to an exemplary embodiment, the second panel 350 is disposed between the first mounting block 362 and the second mounting block 364. In traditional systems, mounting blocks may be in contact with one another and be positioned on the same side of a support panel (e.g., such that one of the mounting blocks is separated from the second panel). The split block arrangement of the present invention may provide packaging advantages. In one embodiment, the split block arrangement is configured to position the rod 302 with respect to the second panel 350 (e.g., directly through, etc.) in a structurally effective manner. The first mounting bock 362 includes a groove 366 (e.g., recessed area) configured to be rotatably coupled to a bushing 370. In the example embodiment shown, the groove 366 is substantially semi-cylindrical. However, in various embodiments, any shape that facilitates the rotational coupling of the bushing 370 surrounding the rod 302 may be used in accordance with the systems and methods disclosed herein. Inner and outer surfaces of the first mounting block 362 each include extending portions 367 that cover end portions of the groove 366. The second mounting block 364 includes a groove 368. In the exemplary embodiment shown, the groove 368 is substantially semi-cylindrical. However, in various other embodiments, another shape that facilitates the rotational coupling of a bushing 370, which may surround the rod 302, may be used. Inner and outer surfaces of the second mounting block 364 each include extending portions 369, similar to extending portions 367 for the first mounting block 362, that cover portions of the groove 368.

Bolts extend through openings in the first and second mounting blocks 362 and 364 such that the set of mounting blocks 358 may be tightly secured around the second panel 350 of the first mounting bracket 306. When coupling surfaces of the first and second mounting blocks 362 and 364 are approximately flush with (e.g., contact) the second panel 350, the extending portions 367 and 369 of the inner and outer surfaces of the mounting blocks 362 and 364 are configured to cover the axial ends of the bushing 370 whose thickness is reduced (e.g., outer diameter) compared with the remainder of the bushing 370. Thus, the uniquely designed structure of the set of mounting blocks 358 facilitates the isolation of the coupling interface between the body of the bushing 370 and the mounting blocks 358. As such, the coupling interface is protected from debris.

Figure 3D:
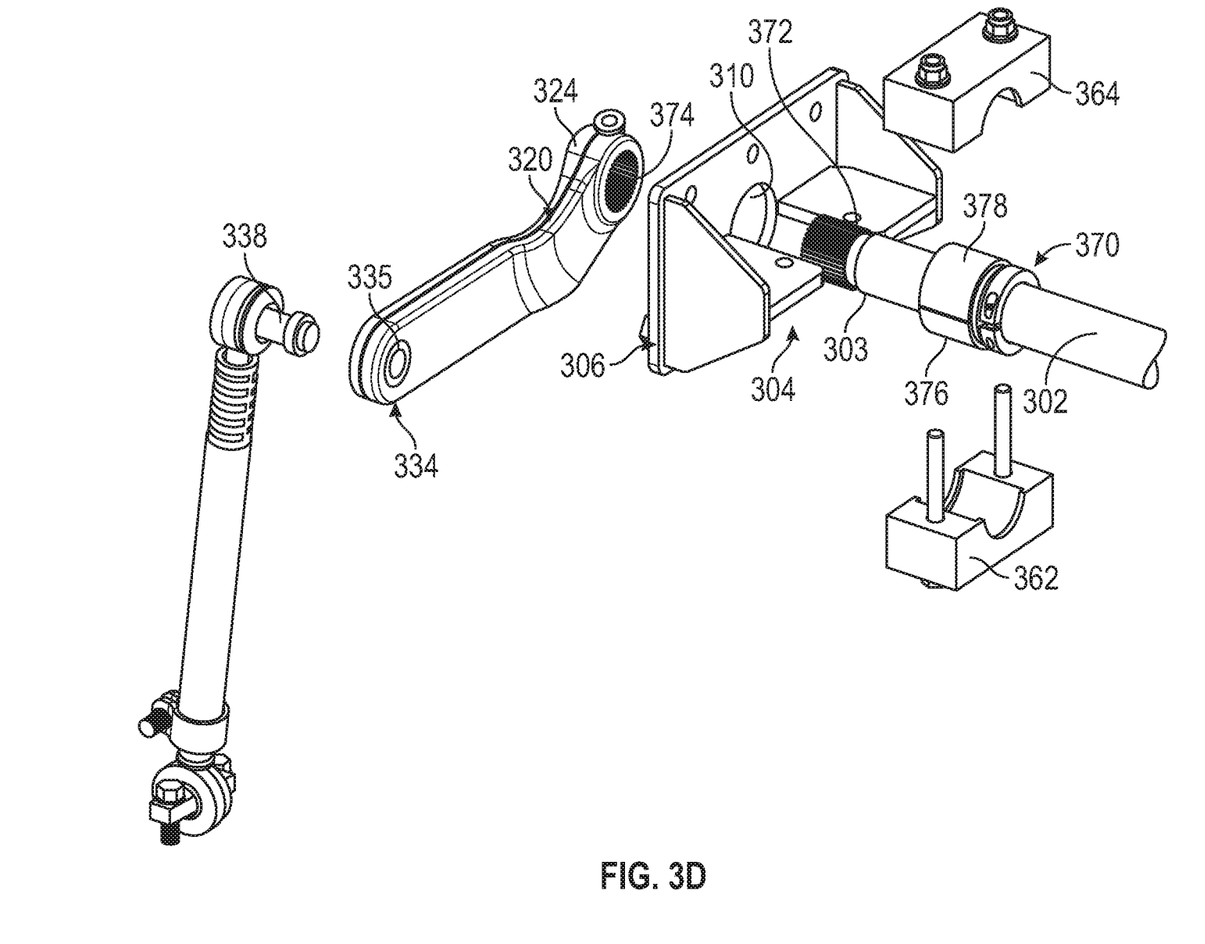
FIG. 3D is an exploded prospective view of the mounting device of FIG. 3B including a bending portion and a link.
Figure 3E:
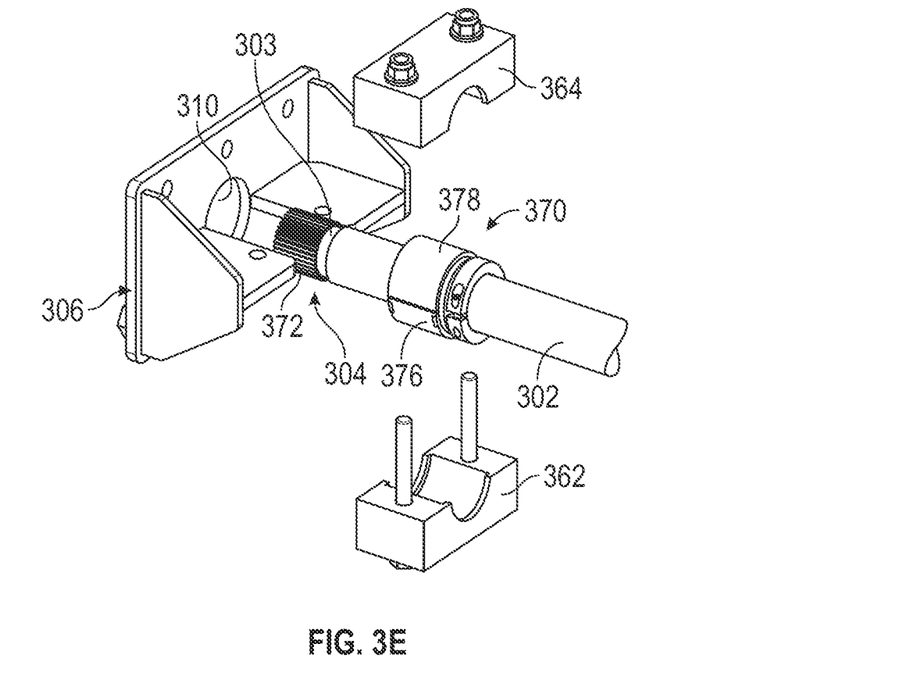
FIG. 3E is a reproduction of FIG. 3D near a bushing for the sway bar system.
Figure 3F:
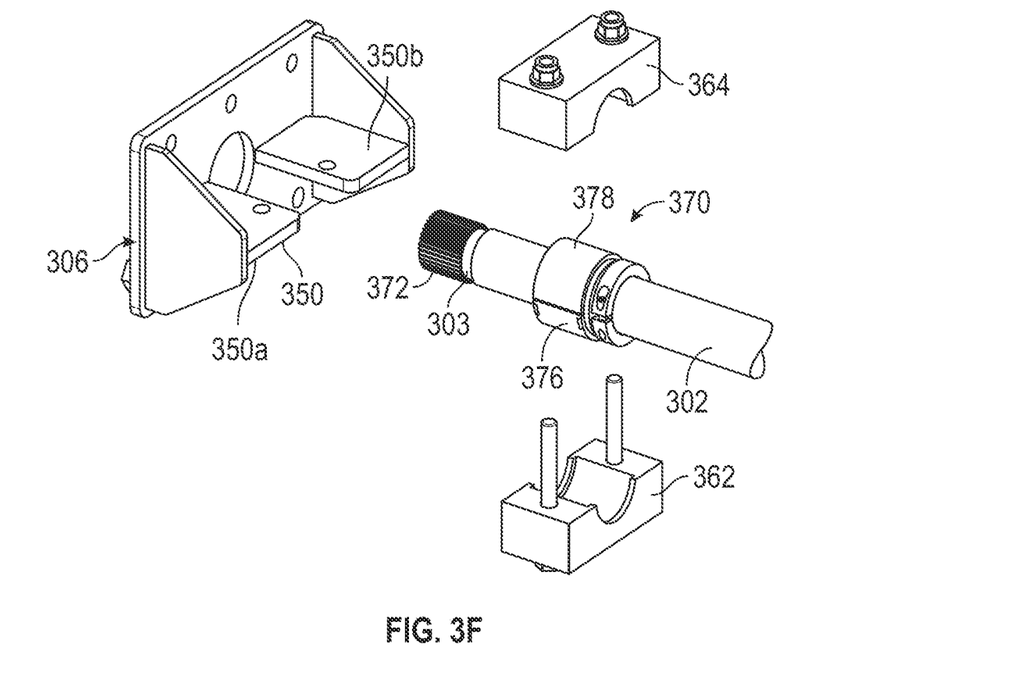
FIG. 3F is an exploded view of the mounting system of FIG. 3B with a bar from the sway bar system separated from a mounting bracket.
Figure 3G:
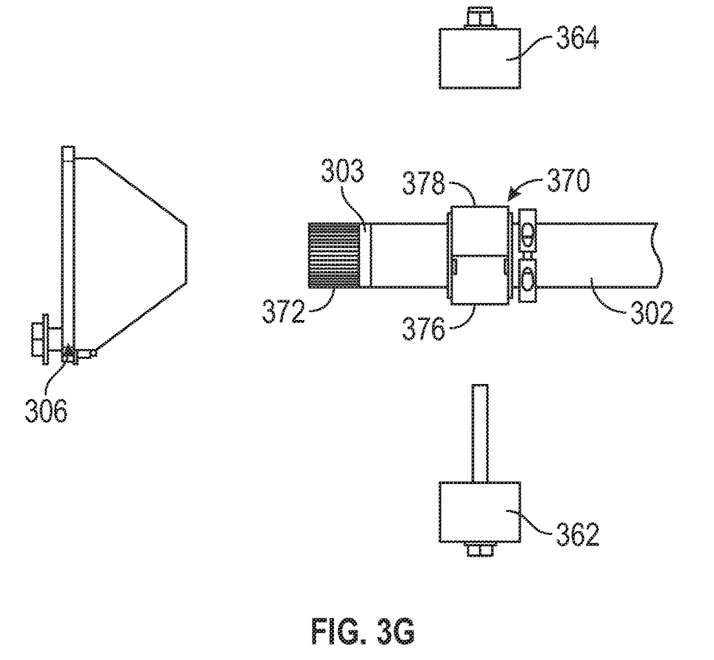
FIG. 3G is an exploded view of the mounting system of FIG. 3B, shown from the side.

As shown in FIGS. 3D-3G, the rod 302 includes a separation groove 303 that separates the main body of the rod 302 from the first end 304. In one embodiment, the first end 304 includes an interface member, shown as a splined end 372 that is substantially the same diameter as the main body of the rod 302. As shown in FIG. 3D, splined end 372 engages (e.g., is coupled to) an interface portion, shown as splined receiver 374 of the cap 324 of the bending portion 320. Such engagement may interlock the movement of the bending portion 320 resulting from movement of link 338 to the rod 302. As such, the rod 302 rotates with the coupling of the bushing 370 and the mounting bracket 306, and rotational torsion is transferred to the other side of the sway bar assembly. According to an alternative embodiment, rod 302 may be otherwise coupled to bending portion 320 (e.g., welding, a bolted connection, a press fit connection, thermal fit connection, etc.).

Also as shown in FIGS. 3D-3G, the bushing 370 is constructed of a first section, shown as first shell 376 and a second section, shown as second shell 378. In the example shown, the first shell 376 and the second shell 378 are substantially semi-cylindrical. The first shell 376 and the second shell 378 interlock to substantially encapsulate (e.g., surround, cover, etc.) a portion of the rod 302 and provide a rotational coupling between the bushing 370 and the grooves of the first and second mounting blocks 362 and 364. As such, a junction is formed between the first shell 376 and the second shell 378.

Figure 3H:
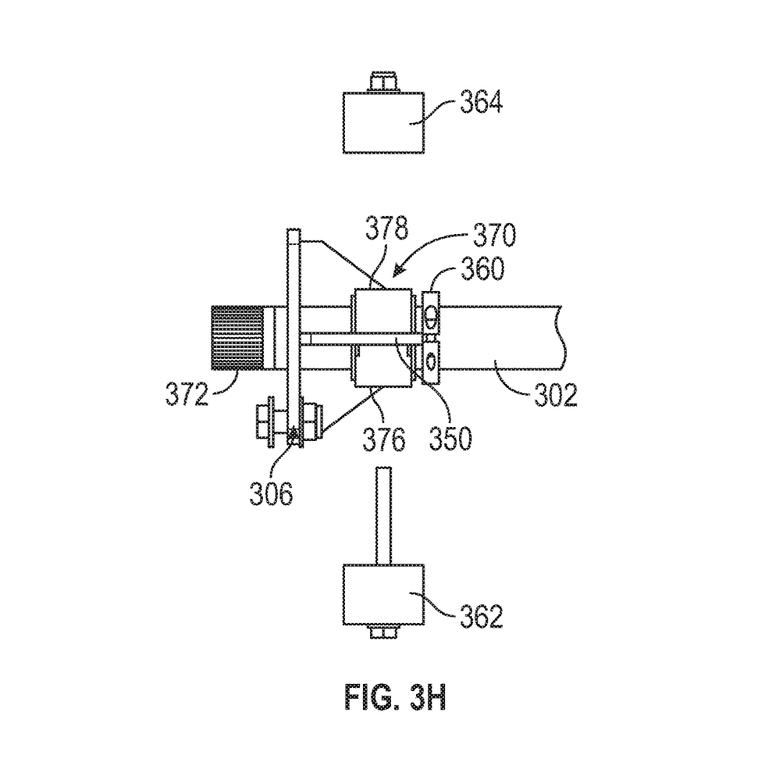
FIG. 3H is a partially exploded view of the mounting system of FIG. 3B, shown from the side.

As shown in FIG. 3H, the symmetrical shaping of the first mounting block 362 and the second mounting block 364 centers the bushing 370 such that the junction between the first and second shells 376 and 378 is substantially aligned with the second panel 350 of the first mounting bracket 306. As such, the junction is protected from the influence of debris that may be projected towards the mounting bracket 306, and a long-lasting rotational coupling of the bushing 370 and the first and second mounting blocks 362 and 364 is ensured.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claim.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claim.

What is claimed is:

1. A vehicle, comprising:
    a frame comprising a first member and a second member, the first member including a first opening, the second member including a second opening, wherein the first member and the second member are spaced apart from one another in at least one position;
    a first mounting bracket disposed proximal the first member, the first mounting bracket comprising:
        a first panel that is substantially parallel to a surface of the first member, the first panel defining a bar opening, the bar opening substantially aligned with the first opening; and
        a second panel extending substantially perpendicular to the first panel, the second panel including an aperture that is substantially aligned with the bar opening;
    a second mounting bracket disposed proximal the second member; and
    a sway bar assembly, comprising:
        a bar comprising a first end and a second end, the bar extending through the first opening and the second opening and being rotatably coupled to the first mounting bracket and the second mounting bracket, the first end extending outward of the first member and the second end extending outward of the second member.

2. The vehicle of claim 1, wherein the bar extends through the bar opening and the aperture.

3. The vehicle of claim 1, wherein the first mounting bracket further comprises a support panel coupled to the first panel and the second panel, the support panel angled with respect to both the first panel and the second panel.

4. The vehicle of claim 3, wherein the support panel is one of a pair of support panels disposed on opposing ends of the second panel.

5. The vehicle of claim 3, wherein the support panel is substantially perpendicular to both the first panel and the second panel.

6. The vehicle of claim 1, further comprising a mounting device that couples the bar to the second panel, the mounting device comprising a first mounting block and a second mounting block, the bar disposed between the first mounting block and the second mounting block.

7. The vehicle of claim 6, wherein the second panel is disposed between the first mounting block and the second mounting block.

8. The vehicle of claim 6, wherein the mounting device is spaced apart from the first panel.

9. The vehicle of claim 6, further comprising a mounting ring disposed on the bar adjacent to the first mounting block, the mounting ring substantially covering at least a portion of a radial gap between the first mounting block and the bar.

10. The vehicle of claim 6, further comprising a bushing disposed between the bar and the mounting device, the first mounting block defining:
    a groove sized to receive a portion of the bushing therein; and
    extending portions on either end of the groove, each of the extending portions covering at least a portion of an end of the bushing.

11. The vehicle of claim 1, further comprising:
    a mounting device that couples the bar to the second panel; and
    a bushing disposed between the bar and the mounting device, wherein the bushing has a step change in radial thickness near at least one axial end of the bushing.

12. A mounting bracket for a sway bar assembly, comprising:
    a first panel defining a bar opening;
    a second panel coupled to the first panel and extending away from the first panel in substantially perpendicular orientation relative to the first panel, the second panel defining an aperture that is substantially aligned with the bar opening;
    a support panel coupled to the first panel and the second panel, the support panel angled with respect to both the first panel and the second panel; and
    a mounting device configured to couple a bar of the sway bar assembly to the second panel, the mounting device comprising a first mounting block that is engageable with a lower surface of the second panel, and a second mounting block that is engageable with an upper surface of the second panel, the first mounting block configured to couple to the second mounting block through the second panel.

13. The mounting bracket of claim 12, wherein the first panel defines a plurality of openings for coupling the first panel to a vehicle frame, the first panel configured to be substantially parallel to the vehicle frame such that the bar opening is substantially aligned with a first opening in the vehicle frame.

14. The mounting bracket of claim 12, wherein the bar opening and the aperture are sized to receive a bar of the sway bar assembly therein.

15. The mounting bracket of claim 12, wherein the first mounting block defines a groove and extending portions on either end of the groove that substantially cover the ends of the groove.

16. A mounting bracket for a sway bar assembly, comprising:
- a first panel defining a bar opening;
- a first extension coupled to the first panel and extending away from the first panel in substantially perpendicular orientation relative to the first panel; and
- a second extension coupled to the first panel and extending away from the first panel in substantially perpendicular orientation relative to the first panel, the second extension substantially parallel to the first extension and spaced apart from the first extension at the bar opening to form a gap therebetween.

17. The mounting bracket of claim 16, wherein the bar opening and the gap are sized to receive a bar of the sway bar assembly therein.

18. The mounting bracket of claim 16, further comprising a mounting device configured to couple a bar of the sway bar assembly to the first extension and the second extension, the mounting device comprising a first mounting block that is engageable with a lower surface of the first extension and the second extension, and a second mounting block that is engageable with an upper surface of the first extension and the second extension, the first mounting block configured to couple to the second mounting block through the first extension and the second extension.

19. The mounting bracket of claim 18, wherein the first mounting block defines a groove and extending portions on either end of the groove that substantially cover the ends of the groove.

* * * * *